United States Patent [19]
Sumida et al.

[11] Patent Number: 5,614,141
[45] Date of Patent: *Mar. 25, 1997

[54] METHOD OF MANUFACTURING LAMINATED FILMS

[75] Inventors: Katsuhiko Sumida; Yuji Iseki; Masahiko Suzuki, all of Amagasaki, Japan

[73] Assignee: Daicel Chemical Industries, Ltd., Osaka, Japan

[*] Notice: The term of this patent shall not extend beyond the expiration date of Pat. No. 5,405,565.

[21] Appl. No.: 341,161

[22] Filed: Nov. 16, 1994

Related U.S. Application Data

[63] Continuation of Ser. No. 859,401, filed as PCT/JP90/01248, Sep. 28, 1990, Pat. No. 5,405,565.

[51] Int. Cl.⁶ .................................................. B29C 47/06
[52] U.S. Cl. ................. 264/173.14; 264/173.19
[58] Field of Search ..................... 264/171.27, 171.28, 264/173.14, 173.16, 173.19, 514, 515; 156/244.11, 254; 428/1, 40, 349, 352, 480, 483

[56] References Cited

U.S. PATENT DOCUMENTS

| | | |
|---|---|---|
| 4,617,207 | 10/1986 | Ueki et al. . |
| 5,061,553 | 10/1991 | Olsen, Jr. . |
| 5,139,831 | 8/1992 | Muller .......................... 428/483 |
| 5,204,181 | 4/1993 | Suzuki et al. . |

FOREIGN PATENT DOCUMENTS

| | | |
|---|---|---|
| 221009 | 9/1982 | European Pat. Off. . |
| 61-51319 | 3/1986 | Japan . |
| 63-31729 | 2/1988 | Japan . |
| 63-199622 | 8/1988 | Japan . |
| 2-178016 | 9/1990 | Japan . |
| 2253919 | 10/1990 | Japan . |
| 2253920 | 10/1990 | Japan . |
| 2227232 | 11/1990 | Japan . |
| 4-135750 | 5/1992 | Japan ............................ 428/1 |

*Primary Examiner*—Jan H. Silbaugh
*Attorney, Agent, or Firm*—Spencer & Frank

[57] ABSTRACT

A laminated film is obtained by laminating, through a liquid crystal polymer layer, a thermoplastic polymer layer which is adhesive to the liquid crystal polymer layer, on a thermoplastic polymer layer which is not adhesive to the liquid crystal polymer layer, such lamination being made in a co-extrusion molding machine, by extruding the laminated layers from a die and by separating the non-adhesive thermoplastic polymer layer from the liquid crystal polymer layer. The adhesive thermoplastic polymer layer is preferably formed by a modified polyolefin into which a functional group is being introduced. The non-adhesive thermoplastic polymer layer is preferably formed by an olefin polymer or a polyalkylene terephthalate.

17 Claims, 3 Drawing Sheets

METHOD OF MANUFACTURING LAMINATED FILMS

CROSS-REFERENCE TO RELATED APPLICATION

This application is a continuation application of application Ser. No. 07/859,401, filed May 28, 1992, now U.S. Pat. No. 5,405,565 which was the national stage of international application No. PCT/JP90/01248 filed Sep. 28th, 1990, the specifications of which are hereby incorporated by reference.

TECHNICAL FIELD

The present invention relates to a method of manufacturing a laminated film containing a liquid crystal polmer layer, with the use of a co-extrusion molding machine.

BACKGROUND ART

With the recent diversification of articles to be packed, a variety of packaging films have been developed. As packaging films, there are known, for example, highly strong films, highly elastic films, resilient films, adhesive films, transparent films, electrically conductive films, light-shielding films, gas-barrier films, heat resistant films, chemical resistant films, composite films obtainable by combining the films above-mentioned, and the like. These packaging films are considerably different from one another in the characteristics of constituent polymers thereof. It is therefore difficult that a one-type film simultaneously satisfies a plurality of characteristics. Accordingly, a variety of packaging films are respectively used according to the purposes.

A liquid crystal polymer classified in engineering plastics is excellent in mechanical properties, dimensional stability, heat resistance, chemical stability and electric properties. Thus, attention is given to the liquid crystal polymer as a polymer film satisfying a variety of requirements. Japanese Patent Publication No. 42287/1985 describes that the liquid crystal polymer film may be divided to form highly elastic split fibers. As apparent from this description, such a film tends to orient in the polymer flowing direction, and is extremely weak in strength in the widthwise direction (hereinafter referred to as TD direction) at a right angle to the film drawing direction (hereinafter referred to as MD direction). To improve the strength of the liquid crystal polymer film in the TD direction, Japanese Patent Application Laid-Open No. 46728/1981 and No. 102234/1986 disclose a method of preparing a biaxially oriented film by increasing the blow ratio at the time when the film is molded by an inflation method. Japanese Patent Application Laid-Open No. 2127/1981 and No. 173620/1988 disclose a method in which a ring die is rotated at the time when a liquid crystal polymer film is molded by an inflation method. Japanese Patent Application Laid-Open No. 59818/1983 discloses a method in which a porous plate-like member having a plurality of fine gaps which can be heated, is formed inside a T-die. Further, Japanese Patent Application Laid-Open No. 31729/1988 discloses a method using a three-layer co-extrusion die, by which both external layers outside of the intermediate layer of a liquid crystal polymer are formed by thermoplastic polymers which are not adhesive to the liquid crystal polymer, and, after the three layers have been co-extruded, the external layers are separated, thereby to obtain the liquid crystal polymer film of the intermediate layer.

However, the thus obtained liquid crystal polymer films are insufficient in thermal adhesive properties (heat weldability). It is therefore not possible to pack an article with such a film by heat seal. Thus, the application of such a film is considerably limited.

It is an object of the present invention to provide a method of manufacturing a laminated film having improved strength in the TD direction thereof.

It is another object of the present invention to provide a method of a laminated film excellent in thermal adhesive properties while the excellent characteristics of a liquid crystal polymer are utilized.

It is a further object of the present invention to provide a method of economically and industrially manufacturing a laminated film suitable for a packaging film or the like.

DISCLOSURE OF THE INVENTION

The inventors have studied intensively and found a thermoplastic polymer excellent in adhesive properties relative to a thermotropic liquid crystal polymer film, thus accomplishing the present invention. The present invention provides a method of manufacturing a laminated film containing a thermotropic liquid crystal polymer layer with using a co-extrusion molding machine. More specifically, in a co-extrusion molding machine, a molten thermoplastic polymer layer which is adhesive to a liquid crystal polymer layer is laminated, through the liquid crystal polymer layer, on a molten thermoplastic polymer layer which is not adhesive to the liquid crystal polymer layer, and the laminated polymers are then extruded from a die, thus forming a laminated film. When extruding the laminated film, the friction force generated at the lip of the die tip does not act directly to the liquid crystal polymer layer, and therefore a multi-layer film excellent in surface smoothness may be obtained. The non-adhesive thermoplastic polymer layer is separated from the liquid crystal polymer layer to obtain a laminated film in which the adhesive thermoplastic polymer layer is being laminated on the liquid crystal polymer layer. In such a laminated film, the adhesive thermoplastic polymer layer may restrain decrease in strength in the TD direction. Also, such a laminated film may be readily stretched uniaxially or biaxially, enabling to enhance the strength of the laminated film. Further, the adhesive thermoplastic polymer layer may give heat-sealing properties or hot-melt adhesive properties to the laminated film.

In the method of the present invention, a non-adhesive thermoplastic polymer layer having heat-sealing properties or hot-melt adhesive properties may be laminated on one surface of a liquid crystal polymer layer through an adhesive thermoplastic polymer layer, and a non-adhesive thermoplastic polymer layer is laminated on the other surface of the liquid crystal polymer layer, and the non-adhesive thermoplastic polymer on the other surface of the liquid crystal polymer layer may be separated from the liquid crystal polymer layer.

According to the method of the present invention, there may be simultaneously obtained two laminated films in each of which a liquid crystal polymer layer and an adhesive thermoplastic polymer layer are laminated on each other. More specifically, a liquid crystal polymer layer and an adhesive thermoplastic polymer layer are successively extruded and laminated on each of both surfaces of a non-adhesive thermoplastic polymer layer with the use of a co-extrusion molding machine to form a five-layer film. Then, the non-adhesive thermoplastic polymer layer of this five-layer film is separated from the liquid crystal polymer layers, thus simultaneously forming two laminated films in each of which the liquid crystal polymer layer and the adhesive thermoplastic polymer layer are being laminated on each other.

According to the method of the present invention, laminated films having a variety of lamination structures may be prepared, with the use of a co-extrusion molding machine having a plurality of passages, by changing the types of polymers fed to the respective passages.

Examples of the thermotropic liquid crystal polymer include a polyester, a polythiol ester, a polyester amide, a polyazomethine, and a polyester carbonate. Fully aromatic polyesters and fully aromatic polyester amides are preferable as the liquid crystal polymer.

Typical examples of the thermoplastic polymer which is adhesive to the liquid crystal polymer layer include a modified polyolefin and a polyester. The polyesters contained in the adhesive thermoplastic polymer layer is other polyesters than a polyalkylene terephthalate and a liquid crystal polyester, and refers to polyesters adhesive to the liquid crystal polymer layer.

Introduced in the modified polyolefin is at least one functional group selected from the group consisting of carboxyl group, glycidyl group, an alkoxysilane group, hydroxyl group, an alkoxy group, an alkoxycarbonyl group and amino group. A preferable adhesive thermoplastic polymer has heat-sealing properties or hot-melt adhesive properties.

Examples of the thermoplastic polymer which is not adhesive to the liquid crystal polymer layer include an olefine polymer, a polyalkylene terephthalate, a polycarbonate, a polyamide, a polyarylate, a polyacetal, a polyether imide, a polyether ether ketone, a polyether sulfone, a polysulfone, a polyphenylene sulfide, and a polyphenylene ether.

In the specification, the term "liquid crystal polymer" refers to a thermotropic liquid crystal polymer and its compositions adapted to be moldable as flowingly softened when heated, and also adapted to form an anisotropic molten phase presenting birefringence when molten.

The term "film" refers to all relatively thin and substantially flat structures which may also be called "sheets" in the technical field to which the present invention pertains.

These objects and advantages of the present invention will be more understood from the following detailed description with reference to the attached drawings.

DETAILED DESCRIPTION OF THE INVENTION

Figure 1:
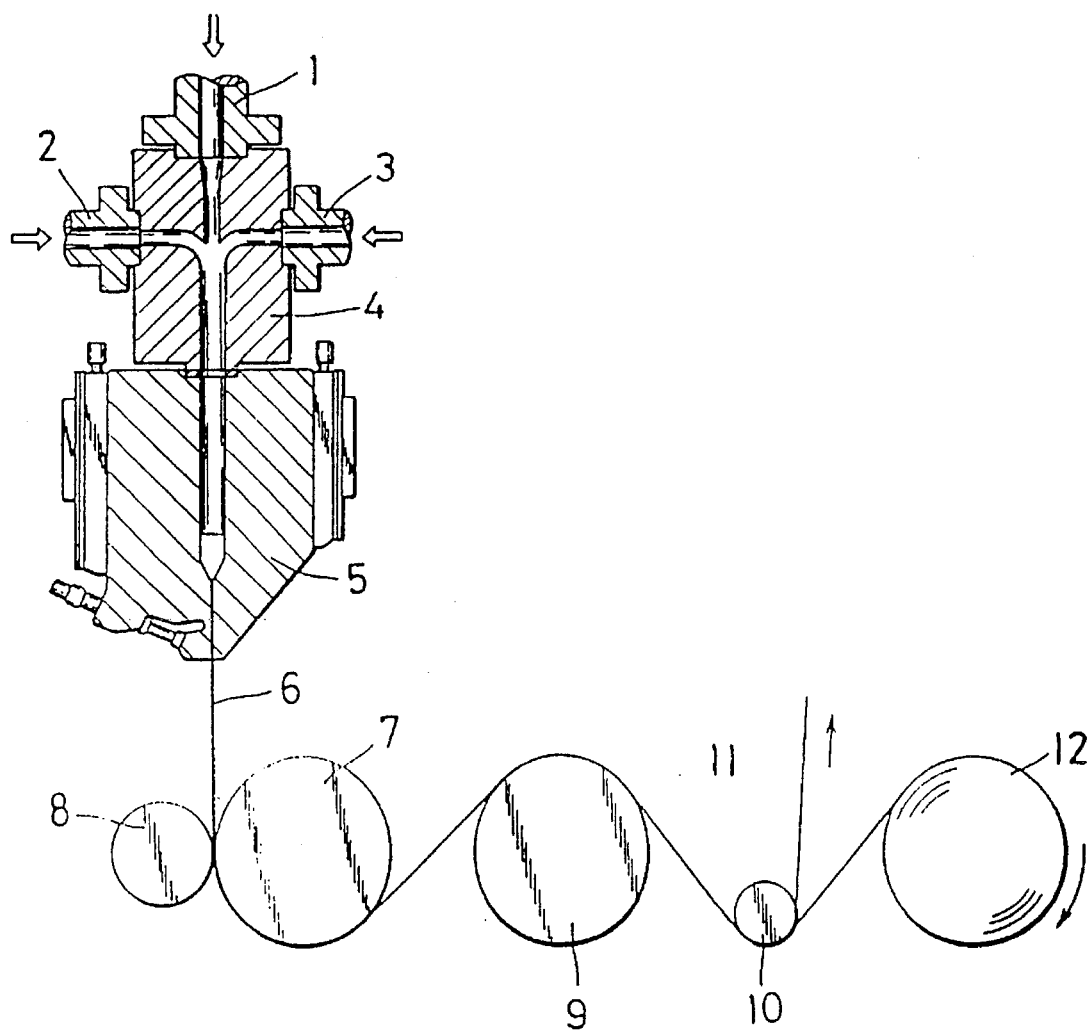
FIG. 1 is a schematic view illustrating an embodiment of a method of manufacturing a laminated film in accordance with the present invention.

As to the liquid crystal polymer which may be used in the practice of the method of the present invention, there may be referred to, for example, U.S. Pat. Nos. 4,726,998 and 4,717,624. Components of the liquid crystal polymer are as follows:

(1) at least one component of aromatic dicarboxylic acids and alicyclic dicarboxylic acids;
(2) at least one component of aromatic diols, alicyclic diols and aliphatic diols;
(3) at least one component of aromatic hydroxy carboxylic acids;
(4) at least one component of aromatic thiol carboxylic acids;
(5) at least one component of aromatic dithiols and aromatic thiolphenols; and
(6) at least one component of aromatic hydroxy amines and aromatic diamines.

Liquid crystal polymers may be composed of any of the following combinations:
(i) polyesters comprising the components (1) and (2);
(ii) polyesters comprising the component (3);
(iii) polyesters comprising the components (1), (2) and (3);
(iv) polythiol esters comprising the component (4);
(v) polythiol esters comprising the components (1) and (5);
(vi) polythiol esters comprising the components (1), (4) and (5);
(vii) polyester amides comprising the components (1), (3) and (6); and
(viii) polyester amides comprising the components (1), (2), (3) and (6).

The liquid crystal polymers include aromatic polyazomethines and polyester carbonates which are not included in the category of the combinations of the above-listed components. Typical examples of polyazomethines include poly(nitrilo-2-methyl-1,4-phenylenenitrilo-ethylidyne-1,4-phenyleneethylidyne), poly(nitrilo-2-methyl-1,4-phenylenenitrilomethylidyne-1,4-phenylene-methylidyne), poly(nitrilo-2-chloro-1,4-phenylene-nitrilomethylidyne-1,4-phenylenemethylidyne) and the like. Polyester carbonates substantially contain 4-oxybenzoyl, dioxyphenyl, dioxycarbonyl and terephthaloyl units.

As typical examples of aromatic dicarboxylic acids, there may be mentioned terephthalic acid, 4,4'-diphenyldicarboxylic acid, 4,4'-triphenyldicarboxylic acid, 2,6-naphthalenedicarboxylic acid, diphenyl ether- 4,4'-dicarboxylic acid, diphenoxyethane-4,4'-dicarboxylic acid, diphenoxybutane-4,4'-dicarboxylic acid, diphenylethane-4,4'-dicarboxylic acid, isophthalic acid, diphenyl ether-3,3'-dicarboxylic acid, diphenoxyethane-3,3'-dicarboxylic acid, diphenylethane-3,3'-dicarboxylic acid, naphthalene-1,6-dicarboxylic acid, etc.; and an alkyl-, an alkoxy-, or a halogen-substituted derivatives of the above aromatic dicarboxylic acids such as chloroterephthalic acid, dichloroterephthalic acid, bromoterephthalic acid, methylterephthatic acid, dimethylterephthalic acid, ethylterephthalic acid, methoxyterephthalic acid, ethoxyterephthalic acid and the like.

As alicyclic dicarboxylic acids, there may be mentioned, for example, trans-1,4-cyclohexanedicarboylic acid, cis-1, 4-cyclo-hexanedicarboxylic acid, 1,3-cyclohexanedicarboxylic acid, etc.; and an alkyl-, an alkoxy-, or a halogen-substituted derivatives of the above alicyclic dicarboxylic acids such as trans-1,4-(1-methyl)cyclohexanedicarboxylic acid, trans-1,4-(1-chloro)cyclohexanedicarboxylic acid and the like.

As typical examples of aromatic diols, there may be mentioned hydroquinone, resorcinol, 4,4'-dihydroxydiphenyl, 4-4'-dihydroxytriphenyl, 2,6-naphalenediol, 4,4'-dihydroxydiphenyl ether, bis(4-hydroxyphenoxy)ethane, 3,3'-dihydroxydiphenyl, 3,3'-dihydroxydiphenyl ether, 1,6-naphthalenediol, 2,2-bis(4-hydroxyphenyl)propane, 1,1- bis(4-hydroxyphenyl)methane and the like; and an alkyl-, an alkoxy-, or a halogen-substituted derivatives of the above aromatic diols such as chlorohydroquinone, methylhydroquinone, 1-butylhydroquinone, phenylhydroquinone, methoxyhydroquinone, phenoxyhydroquinone, 4-chlororesorcinol, 4-methylresorcinol and so on.

Examples of alicyclic diols include trans-1,4-cyclohexanediol, cis-1,4-cyclohexanediol, trans-1,4-cyclohexanedimethanol, trans-1,3-cyclohexanediol, cis-1,2-cyclohexanediol, trans-1,3-cyclohexanedimethanol, etc.; and an alkyl-, an alkoxy-, or a halogen-substituted derivatives of the above alicyclic diols such as trans-1,4-(1-methyl)cyclohexanediol and trans 1,4-(1-chloro)-cyclohexanediol, etc.

Typical examples of aliphatic diols include straight-chain and branched aliphatic diols such as ethylene glycol, 1,3-propanediol, 1,4-butanediol, neopentyl glycol, etc.

As examples of aromatic hydroxycarboxylic acids, there may be mentioned 4-hydroxybenzoic acid, 3-hydroxybenzoic acid, 6-hydroxy-2-naphthoic acid, 6-hydroxy-1-naphthoic acid and the like; and an alkyl-, an alkoxy-, or a halogen-substituted derivatives of the aromatic hydroxycarboxylic acids such as 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 6-hydroxy-5-methyl-2-naphthoic acid, 6-hydroxy-5-methoxy-2-naphthoic acid, 3-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, 6-hydroxy-5,7-dichloro-2-naphthoic acid and the like.

As examples of aromatic mercapto carboxylic acids, there may be mentioned 4-mercaptobenzoic acid, 3-mercaptobenzoic acid, 6-mercapto-2-naphthoic acid, 7-mercapto-2-naphthoic acid, etc.

Aromatic dithiols include, for example, benzene-1,4-dithiol, benzene-1,3-dithiol, 2,6-naphthalenedithiol, 2,7-naphthalenedithiol, etc.

Aromatic mercapto phenols include, for example, 4-mercaptophenol, 3-mercaptophenol, 2-mercaptophenol, etc.

Examples of aromatic hydroxy amines and aromatic diamines include 4-aminophenol, N-methyl-4-aminophenol, 1,4-phenylenediamine, N-methyl-1,4-phenylenediamine, N,N'-dimethyl-1,4-phenylenediamine, 3-aminophenol, 3-methyl-4-aminophenol, 2-chloro-4-aminophenol, 4-amino-1-naphthol, 4-amine-4'-hydroxydiphenyl, 4-amino-4'-hydroxydiphenyl ether, 4-amino-4'-hydroxydiphenylmethane, 4-amino-4'-hydroxydiphenyl sulfide, 4,4'-diaminodiphenyl sulfide (thiodianiline), 4,4'-diaminodiphenyl sulfone, 2,5-diaminotoluene, 4,4'-ethylenedianiline, 4,4'-diaminodiphenoxyethane, 4,4'-diaminodiphenylmethane (methylenedianiline), 4,4'-diaminodiphenyl ether (oxydianiline), etc.

The above-listed polymers include those which may present, when molten, no birefringence dependent on the constituent components, the ratio of the components in the polymer and sequence distribution. The polymers to be used in the present invention are limited to those which present birefringence when molten.

As to a method of manufacturing a liquid crystal polymer to be used in the present invention, it is possible to refer to any of conventional methods, for example, those disclosed in the U.S. Pat. Nos. 4,726,998 and 4,717,624 mentioned earlier.

Fully aromatic polymers suitably used in the present invention tend to be substantially insoluble in common solvents, and therefore are unsuitable for solution processing. However, such polymers may be readily processed by a normal melt processing. Particularly preferable fully aromatic polymers are somewhat soluble in pentafluorophenol.

The preferred fully aromatic polyesters have usually a weight average molecular weight of about 2,000 to 200,000, preferably about 10,000 to 50,000, and more preferably about 20,000 to 25,000. The preferred fully aromatic polyester amides have usually a weight average molecular weight of about 5,000 to 50,000, preferably about 10,000 to 30,000, for example, 15,000 to 17,000. These molecular weights can be measured by gel permeation chromatography and other standard methods not causing dissolution of polymers, for example, determination of terminal groups by the infrared spectrophotometry of a compression-formed film. The molecular weights may also be measured by preparing a pentafluorophenol solution and using a light scattering method.

When dissolved in pentafluorophenol at a concentration of 0.1 wt % at 60° C., the fully aromatic polyester amides generally show an intrinsic viscosity (I.V.) of at least about 2.0 dl/g, for example, in a range from about 2.0 to 10.0 dl/g.

The preferred polyesters forming an anisotropic molten phase contain repeating units comprising naphthalene moieties, such as 6-hydroxy-2-naphthalene, 2,6-dihydroxynaphthalene, and 2,6-dicarboxynaphthalene in quantities larger than about 10 mol %. The preferred polyester amides contain repeating units of the above-said naphthalene moieties and the other moieties comprising 4-aminophenol or 1,4-phenylenediamine. More specifically, polyesters and polyester amides are as follows:

(A) Polyesters substantially composed of the following repeating units I and II:

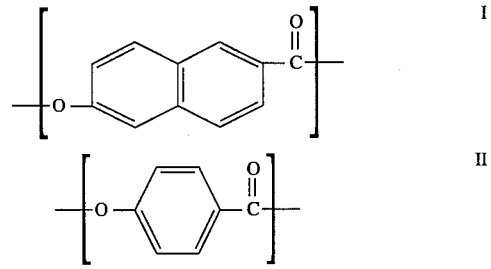

The polyesters contain about 10 to 90 mol % of the unit I and about 10 to 90 mol % of the unit II. In one aspect, the unit I is present in a quantity ranging from about 65 to 85 mol % (e.g., about 75 mol %). In another aspect, the unit II is present in a quantity of as small as about 15 to 35 mol %, preferably 20 to 30 mol %. At least one hydrogen atom bonded to the ring may be substituted by a substituent selected from the group consisting of an alkoxy group having 1 to 4 carbon atoms, a halogen atom, phenyl group, a substituted phenyl group and a combination of these groups.

(B) Polyesters substantially composed of the following repeating units II, III and IV:

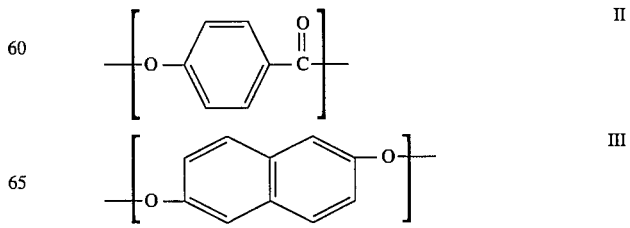

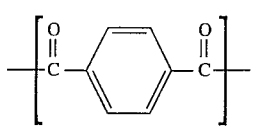
IV

The polyesters contain about 30 to 70 mol % of the unit II. Polyesters are preferably composed of about 40 to 60 mol % of the unit II, about 20 to 30 mol % of the unit III and about 20 to 30 mol % of the unit IV. At least one hydrogen atom bonded to the ring may be substituted by a substituent selected from the group consisting of an alkoxy group having 1 to 4 carbon atoms, a halogen atom, phenyl group, a substituted phenyl group and a combination of these groups.

(C) Polyesters substantially composed of the following repeating units II, IV, V and VI:

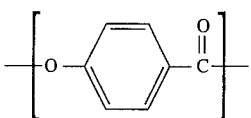
II

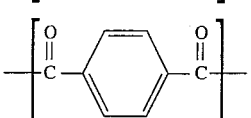
IV

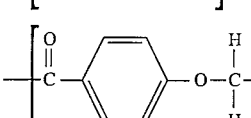
V

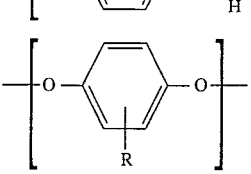
VI (wherein R represents methyl group, chloro, bromo, or the combination thereof, which is a substituent for the hydrogen atom of the aromatic ring).

The polyesters are composed of about 20 to 60 mol % of the unit II, about 5 to 35 mol % of the unit IV, about 5 to 18 mol % of the unit V and about 20 to 40 mol % of the unit VI, preferably, about 35 to 45 mol % of the unit II, about 15 to 25 mol % of the unit IV, about 10 to 15 mol % of the unit V and about 25 to 35 mol % of the unit VI. The total molar concentration of the units IV and V is substantially equal to that of the unit VI. At least one hydrogen atom bonded to the ring may be substituted by a substituent selected from the group consisting of an alkyl group having 1 to 4 carbon atoms, an alkoxy group having 1 to 4 carbon atoms, a halogen atom, phenyl group, a substituted phenyl group and a combination of these groups. The fully aromatic polyesters generally show an intrinsic viscosity of at least 2.0 dl/g, for example 2.0 to 10.0 dl/g, when dissolved in pentafluorophenol at a concentration of 0.3 w/v % at a temperature of 60° C.

(D) Polyesters substantially composed of the following repeating units I, II, VII and VIII:

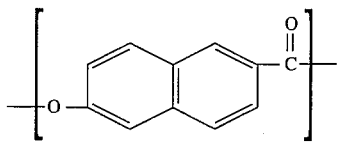
I

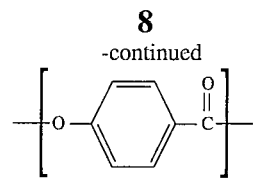
II

A Dioxyaryl unit VII represented by the following general formula:

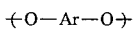
VII (wherein Ar represents a bivalent group containing at least one aromatic ring).

A dicarboxyaryl unit VIII represented by the following general formula:

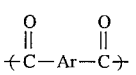
VIII (wherein Ar has the same meaning as defined above).

The polyesters are composed of about 20 to 40 mol % of the unit I, from more than 10 up to about 50 mol % of the unit II, from more than 5 up to about 30 mol % of the unit VII and from more than 5 up to about 30 mol % of the unit VIII, preferably about 20 to 30 mol % (for example, about 25 mol %) of the unit I, about 25 to 40 mol % (for example, about 35 mol %) of the unit II, about 15 to 25 mol % (for example, about 20 mol %) of the unit VII and about 15 to 25 mol % (for example, about 20 mole %) of the unit VIII. At least one hydrogen atom bonded to the ring may be substituted by a substituent selected from the group consisting of an alkyl group having 1 to 4 carbon atoms, an alkoxy group having 1 to 4 carbon atoms, a halogen atom, phenyl group, a substituted phenyl group and a combination of these groups.

The units VII and VIII are preferably symmetrical in the sense that bivalent bonds which bond these units to other units on both sides in main chains of polymers are positionally symmetrical on one or two aromatic rings (for example, these units are in positions of para with each other or on the diagonal ring when present on the naphthalene ring). However, nonsymmetrical units such as those derived from resorcinol or isophthalic acid are also usable.

The preferable dioxyaryl unit VII is;

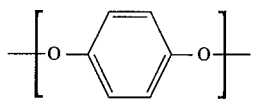

and the preferable dicarboxyaryl unit VIII is:

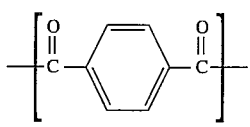

(E) Polyesters substantially composed of the following repeating units I, VII and VIII:

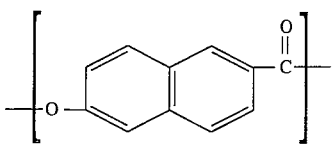
I

A dioxyaryl unit VII represented by the following general formula:

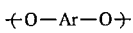 VII (wherein Ar has the same meaning as defined above).

A dicarboxyaryl unit VIII represented by the following general formula:

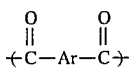 VIII (wherein Ar has the same meaning as defined above).

The polyesters are composed of about 10 to 90 mol % of the unit I, 5 to 45 mol % of the unit VII and 5 to 45 mol % of the unit VIII, preferably about 20 to 80 mol % of the unit I, about 10 to 40 mol % of the unit VII and about 10 to 40 mol % of the unit VIII. More desirably, the polyesters are composed of about 60 to 80 mol % of the unit I, about 10 to 20 mol % of the unit VII and about 10 to 20 mol % of the unit VIII. At least one hydrogen atom may be substituted by a substituent selected from the group consisting of an alkyl group having 1 to 4 carbon atoms, an alkoxy group having 1 to 4 carbon atoms, a halogen atom, phenyl group, a substituted phenyl group and a combination of these groups.

The preferred dioxyaryl unit VII is;

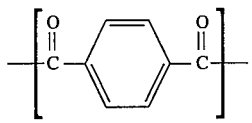

and the preferred dicarboxyaryl unit VIII is:

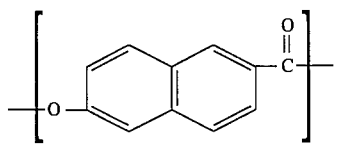

(F) Polyester amides substantially composed of the following repeating units I, IX, X and VII:

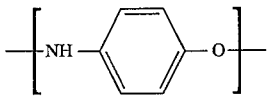 I

A unit IX represented by the following general formula:

 IX (wherein A represents a bivalent group containing at least one aromatic ring or a bivalent trans-cyclohexane group).

A unit X represented by the following general formula:

 X (wherein Ar has the same meaning as defined above; Y represents O, NH, or NR; Z represents NH or NR, and R represents an alkyl group having 1 to 6 carbon atoms or an aryl group).

A unit VII represented by the following general formula:

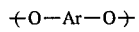 VII (wherein Ar has the same meaning as defined above).

The polyester amides are composed of about 10 to 90 mol % of the unit I, about 5 to 45 mol % of the unit IX, about 5 to 45 mol % of the unit X and about 0 to 40 mol % of the unit VII. At least one hydrogen atom bonded to the ring may be substituted by a substituent selected from the group consisting of an alkyl group having 1 to 4 carbon atoms, an alkoxy group having 1 to 4 carbon atoms, a halogen atom, phenyl group, a substituted phenyl group and a combination of these groups.

The preferred dicarboxyaryl unit IX is;

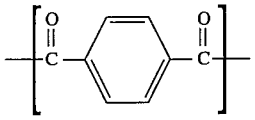

the preferred unit X is;

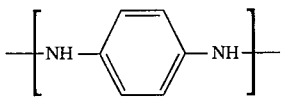

or

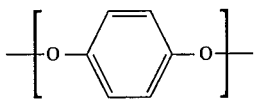

and the preferred dioxyaryl unit VII is:

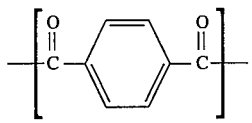

Polymers which form an anisotropic molten phase according to the present invention include one wherein one part of a polymer chain is composed of a segment of a polymer forming an anisotropic molten phase as described above and the other part of the polymer chain is composed of a segment of a thermoplastic resin not forming an anisotropic molten phase.

The thermal deformation temperature of the liquid cryatal polymer is usually in a range from about 80° to 400° C., and preferably from about 120° to 350° C. Thus, the polymer is excellent in heat resistance. Particularly, the liquid crystal polymer having a thermal deformation temperature of 150° to 250° C. is excellent in film forming properties.

The elastic modulus of the liquid crystal polymer is in the range of $6.0 \times 10^4$ to $2.5 \times 10^5$ kgf/cm$^2$, preferably $7.5 \times 10^4$ to $2.5 \times 10^5$ kgf/cm$^2$, and more preferably $9.0 \times 10^4$ to $2.5 \times 10^5$ kgf/cm$^2$. The tensile strength of the liquid crystal polymer is in the range of 1,000 to 3,000 kgf/cm$^2$, preferably 1,500 to 3,000 kgf/cm$^2$ and more preferably 1,800 to 3,000 kgf/cm$^2$. Thus, the liquid crystal polymer is excellent in mechanical characteristics. The liquid crystal polymer presents vapor permeability of 8 g/m$^2$•25 μm•24 hours•atm or less, preferably 4 g/m$^2$•25 μm•24 hours•atm or less, and more preferably about 1.5 g/m$^2$•25 μm•24 hours•atm or less, and therefore the liquid crystal polymer is excellent in water vapor barrier characteristics. Further, the liquid crystal polymer exhibits oxygen/carbon dioxide gas permeability of 10 cc/m$^2$•25 μm•24 hours•atm or less, preferably 5 cc/m$^2$•25 μm•24 hours•atm or less, and more preferably 1.0 cc/m$^2$•25 μm•24 hours•atm or less. Thus, the liquid crystal polymer is also excellent in gas barrier characteristics. Furthermore, even though the polymer is left in an atmosphere of a temperature of 70° C. and a relative humidity of 96% for 500 hours, the polymer undergoes a change as small as about 0.003 to about 0.02%. This proves that the polymer is excellent in dimensional stability. Thus, the laminated film containing the liquid crystal polymer layer is excellent in mechanical properties, heat resistance, gas barrier characteristics, dimensional stability and the like. Accordingly a one-type laminated film may satisfy a variety of requirements.

The polymer composition forming an anisotropic molten phase and capable of melt processing to be used in the present invention may further contain at least one member selected from the group consisting of other polymers forming an anisotropic molten phase, thermoplastic resins not forming an anisotropic molten phase, thermosetting resins, low-molecular organic compounds, and inorganic substances. In the composition, the polymer forming an anisotropic molten phase may be thermodynamically compatible with the other component of the composition.

As the thermoplastic resins, there may be mentioned, for example, polyethylene, polypropylene, polybutylene, polybutadiene, polyisoprene, polyvinyl acetate, an ethylene-vinyl acetate copolymer, an ethylene-acrylate copolymer, an ethylene-methacrylate copolymer, an ionomer, polyvinyl chloride, polyvinylidene chloride, a polystyrene, an acrylic resin, an ABS resin, an AS resin, an BS resin, a polyurethane, a silicone resin, an fluoro resin, a polyacetal, a polycarbonate, polyethylene terephthalate, polybutylene terephthalate, an aromatic polyester, a polyamide, polyacrylonitrile, polyvinyl alcohol, a polyvinyl ether, a polyether imide, a polyamide imide, a polyether ether imide, a polyether ether ketone, a polyether sulfone, a polysulfone, a polyphenylene sulfide, and a polyphenylene oxide.

As the thermosetting resins, there may be mentioned, for example, a phenolic resin, an epoxy resin, a melamine resin, a urea resin, an unsaturated polyester and an alkyd resin.

As examples of the low-molecular organic compounds, there may be mentioned additives for common thermoplastic and thermosetting resins, such as plasticizers, light-resistant and weather-proof stabilizers, e.g. antioxidants and ultraviolet absorbers, anti-static agents, flame retarders, coloring agents, e.g. dyestuff and pigment, foaming agents, crosslinking agents, e.g. divinyl compounds, peroxides and vulcanizers, and low-molecular organic compounds used as lubricants for improving fluidity and mold releasability.

The inorganic substances include, for example, additives for common thermoplastic and thermosetting resins, that is, ordinary inorganic fibers such as glass, carbon, metallic, ceramic, boron fibers and asbestos; powdery substances such as calcium carbonate, highly dispersible silicic acid, alumina, aluminium hydroxide, talc powder, mica, glass flake, glass bead, quartz powder, silica sand, various metal powders, carbon black, barium sulfate, and calcium sulfate; inorganic compounds such as silicone carbide, boron nitride, and silicon nitride; and whiskers and metallic whiskers.

The liquid crystal polymer layer contains at least 50% by weight, preferably 75% by weight or more, of the liquid crystal polymer.

In the present invention, the thermoplastic polymer adhering to the liquid crystal polymer layer above-mentioned, is a polymer which is adhesive to the liquid crystal polymer layer as molten or as cooled and solidified. As such an adhesive thermoplastic polymer, there may be preferably used, for example, a modified polyolefine or a modified polyester. The liquid crystal polyester and a polyalkylene terephthalate, which is not adhesive to the liquid crystal polymer layer, are not belonged to the polyester as the adhesive thermoplastic polymer. There may be used a modified polyolefin or a polyester which is not thermally decomposed at the time of extrusion molding and which has film forming properties.

A modified polyolefin being introduced a functional group is preferable. Examples of the functional group include carboxyl group, glycidyl group, an alkoxysilane group, hydroxyl group, an alkoxy group, an alkoxy carbonyl group, amino group and the like. The preferred functional group is carboxy group, the glycidyl group and the alkoxysilane group. A plurality of functional groups may be introduced, in combination, into olefin polymers. As examples of the modified polyolefin, there may be mentioned a carboxy modified polyolefin, a glycidyl modified polyolefin, an alkoxysilane modified polyolefin, a carboxy modified ethylene-ethyl acrylate copolymer, a glycidyl modified ethylene-ethyl acrylate copolymer, an alkoxysilane modified ethylene-ethyl acrylate copolymer, a carboxy modified ethylene-vinyl acetate copolymer, a glycidyl modified ethylene-vinyl acetate copolymer, an alkoxysilane modified ethylene-vinyl acetate copolymer or the like.

A carboxy modified, glycidyl modified, or alkoxysilane modified substance refers to a substance modified by an unsaturated carboxylic acid or an acid anhydride thereof such as acrylic acid, maleic anhydride or the like; a polymerizable unsaturated compound having glycidyl group such as glycidyl acrylate, glycidyl methacrylate or the like; or a polymerizable unsaturated compound having an alkoxysilane group such as methacryloxypropyltrimethoxysilane or the like.

The polyester having adhesive properties to the liquid crystal polymer layer is composed of polybasic acids and lower alkyl esters thereof, polyhydric alcohols, hydroxycarboxylic acids, and optionally a small amount of monobasic acids and a small amount of monohydric alcohols.

The polybasic acids include acids containing two or more carboxylic groups. As the polybasic acids, there may be mentioned, for example, aliphatic polybasic acids such as oxalic acid, maleic acid, maleic anhydride, succinic acid, adipic acid, pimelic acid, suberic acid, azelaic acid, sebacic acid, dodecanoic acid or the like; alicyclic polybasic acids such as 1,4-cyclohexanedicarboxylic acid or the like; and aromatic polybasic acids such as phthalic acid, phthalic anhydride, terephthalic acid, isophthalic acid, trimellitic acid, trimellitic anhydride, pyromellitic acid, pyromellitic anhydride, trimesic acid, naphthalene-2,6-dicarboxylic acid, diphenyl-4,4'-dicarboxylic acid, 3-sulphoisophthalic acid or the like. The polybasic acids may be used in combination. Among these polybasic acids, there is preferably used polybasic acid which mainly contains terephthalic acid in an amount of, for example, 30 to 80 mol % of all components of the polybasic acid and which contains adipic acid, sebacic acid and isophthalic acid as other components of the polybasic acid.

The polyhydric alcohols include alcohols having two or more hydroxyl groups. As examples of the alcohol, there may be mentioned aliphatic polyhydric alcohols such as ethylene glycol, diethylene glycol, triethylene glycol, polyethylene glycol, propylene glycol, dipropylene glycol, tripropylene glycol, polypropylene glycol, trimethylene glycol, 1,4-butanediol, 1,3-butanediol, 1,5-pentanediol, 1,6-hexanediol, neopentyl glycol, glycerol, trimethylol propane, pentaerythritol or the like; alicyclic polyhydric alcohols such as 1,4-cyclohexanedimethanol or the like; and aromatic polyhydric alcohols such as resorcinol, 2,2-bis(4-hydroxyphenyl)propane, 4,4'-bis (2-hydroxyethyl)phenyl-2,2-propane, 4,4'-bis(2-hydroxy-propyl)phenyl-2,2-propane, 4,4'-bis(2-hydroxy-ethoxyethyl)phenyl-2,2-propane, or the like. The polyhydric alcohols may be used in combination. Among these polyhydric alcohols, ethylene glycol and 1,4-butanediol are preferable, and 1,4-butanediol is more preferable.

Examples of hydroxycarboxylic acid include aliphatic hydroxycarboxylic acids such as glycolic acid, oxypropionic acid or the like; and aromatic hydroxycarboxylic acids such as hydroxybenzoic acid or the like. The hydroxycarboxylic acids may be used in combination.

It should be understood that the polyester above-mentioned includes another polymers containing, as their segment components, the components of the adhesive thermoplastic polyester, e.g., polyester ethers, polyester amides, polyester carbonates and the like.

Among these adhesive thermoplastic polymers, polymers having heat-sealing properties (heat weldability) or hot-melt adhesive properties are preferable.

The adhesive thermoplastic polymers may be used either singly or in combination.

The adhesive thermoplastic polymer layer may contain the thermoplastic resin, a lower molecular organic compound, and an inorganic substance above-mentioned. The adhesive thermoplastic polymer layer contains at least 50% by weight and preferably 75% by weight or more of the adhesive thermoplastic polymer.

The thermoplastic polymer which is not adhesive to the liquid crystal polymer layer, refers to a polymer which is not adhesive to the liquid crystal polymer layer as molten or as cooled and solidified. There may be used a non-adhesive thermoplatic polymer which is not thermally decomposed at the time of extrusion molding and which has film forming properties. As the non-adhesive thermoplastic polymer, there may be mentioned, for example, an olefin polymer, a polyalkylene terephthalate, a polycarbonate, a polyamide, a polyarylate, a polyacetal, a polyether imide, a polyether ether ketone, a polyethersulfone, a polysulfone, a polyphenylene sulfide, a polyphenylene ether and the like.

Examples of the olefin polymers include polyethylene, polypropylene, ethylene-propylene copolymers, poly(4-methylpentene-1), ionomers, ehtylene-ethyl acrylate copolymers, ethylene-vinyl acetate copolymers and the like. Among these polyolefin films, there may be preferably used polyethylene (particularly, high-density polyethylene and an intermediate-density polyethylene), polypropylene, and an ethylene-propylene copolymer (particularly, an ethylene-propylene copolymer having a melting point of 145° to 160° C.).

Examples of the polyalkylene terephthalate include polyesters containing an alkylene group having about 2 to 6 carbon atoms, and polyesters having a cycloalkylene group, an ether group or the like at part of the alkylene group above-mentioned. Particularly preferable are polyethylene terephthalate, PET-G (Trade name of Eastman Chemical Products Co., Ltd.) in which part of ethylene glycol of polyethylene terephthalate is substituted with 1,4-cyclohexanedimethanol, diethylene glycol or the like, and polybutylene terephthalate. The PET-G has heat-sealing properties.

The non-adhesive thermoplastic polymers may be used either singly or in combination.

Likewise the adhesive thermoplastic polymer layer, the non-adhesive thermoplastic polymer layer may contain the thermoplastic resin, a lower molecular organic compound, an inorganic substance mentioned earlier. The non-adhesive thermoplastic polymer layer contains at least 50% by weight and preferably 75% by weight or more of the non-adhesive thermoplastic polymer.

According to the present invention, the liquid crystal polymer, the adhesive thermoplastic polymer and the non-adhesive thermoplastic polymer are respectively molten and extruded by extruders. In a co-extrusion molding machine, the adhesive thermoplastic polymer layer is laminated on one surface of the liquid crystal polymer layer and the non-adhesive thermoplastic polymer layer is laminated on the other surface of the liquid crystal polymer layer, and these three layers are then extruded from the die. The non-adhesive thermoplastic polymer layer of the extruded multi-layer film is separated from the liquid crystal polymer layer to produce a laminated film.

Particular restrictions are not imposed on the co-extrusion molding machine, as far as the machine is capable of co-extruding and molding the materials in multi-layers. Examples of the co-extrusion molding machine include a multi-manifold die, a machine of the feed block type I in which a feed block and a single-layer die are combined, a machine of the feed block type II in which a feed block and a multi-manifold die are combined, a machine adapted to achieve co-extrusion molding in which polymers respectively forming the layers of the multi-layer film are molded at different temperatures, such as VEIN DIE manufactured by Kuloren Co., Ltd. and the like. It is noted that the feed block is a co-extrusion multi-layer film manufacturing apparatus sold by Daw Co., Ltd., Eagan Co., Ltd., Kuloren Co., Ltd. and the like in USA.

The following description will illustrates a method of manufacturing a laminated film in accordance with the present invention with reference to the attached drawings.

An embodiment of the present invention shown in FIG. 1 employs a co-extrusion molding machine of the feed block type I above-mentioned for manufacturing a two-layer laminated film. A liquid crystal polymer is extruded as molten by an extruder (not shown) and then fed to a feed block 4 through a feed pipe 1 connected to the extruder. An adhesive thermoplastic polymer is extruded as molten by an extruder (not shown), and fed to one side of the liquid crystal polymer layer in the feed block 4 through a feed pipe 2. In the same manner as described above, a non-adhesive thermoplastic polymer is fed to the other side of the liquid crystal polymer layer through a feed pipe 3. In the feed block 4, the molten polymers meet one another at the junction of three passages to form a three-layer molten polymer in which the liquid crystal polymer layer serves as the intermediate layer on one surface of which the adhesive thermoplastic polymer layer is being laminated and on the other surface of which the non-adhesive thermoplastic polymer layer is being laminated. The molten polymer is fed to a single manifold T-die 5, i.e., a single-layer die, connected to the feed block 4, and then extruded in the form of a film.

A three-layer film 6 extruded from the T-die 5 is cooled by a cooling roll 7 and pressed by a pressure roll 8 opposite to the cooling roll 7. After the film 6 has passed through first and second rolls 9, 10, the non-adhesive thermoplastic polymer layer 11 is separated from the liquid crystal polymer layer. This produces a laminated film in which the adhesive thermoplastic polymer layer is being laminated on one surface of the liquid crystal polymer layer. This laminated film is then wound on a winding roll 12. The non-adhesive thermoplastic polymer layer 11 may be separated from the liquid crystal polymer layer before the film 6 reaches the winding roll 12.

Figure 2:
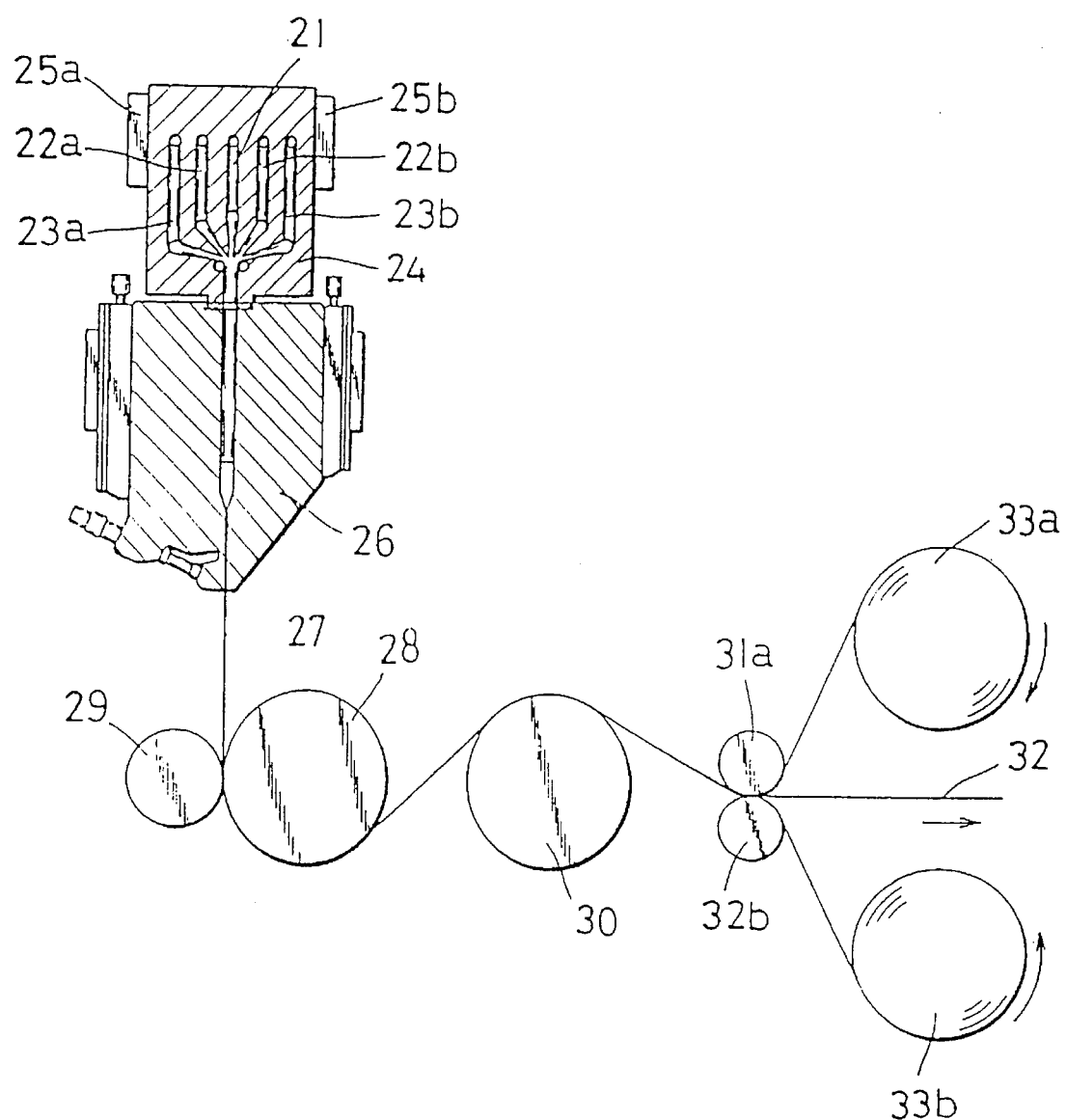
FIG. 2 is a schematic view illustrating another embodiment of a method of manufacturing a laminated film in accordance with the present invention.

In another embodiment of the present invention shown in FIG. 2, two two-layer laminated films are simultaneously manufactured. A non-adhesive thermoplastic polymer is fed to a first passage 21 of a feed block 24 by an extruder (not shown), and a liquid crystal polymer is fed to second passages 22a, 22b at both sides of the first passage 21 of the feed block 24 by an extruder (not shown). An adhesive thermoplastic polymer is fed to third passages 23a, 23b at both external sides of the second passages 22a, 22b by an extruder (not shown). The molten polymers meet one another at the junction point of the five passages to form a five-layer molten polymer. In this embodiment, the second passages 22a, 22b may communicate with each other by switching the passages by a selector plug 25a mounted on the feed block 24, while the third passages 23a, 23b may communicate with each other by switching the passages by a selector plug 25b mounted on the feed block 24. The selector plugs 25a, 25b are adapted to cause the second passages 22a, 22b and the third passages 23a, 23b to communicate with one another in a desired combination.

Likewise in the embodiment mentioned earlier, the five-layer molten polymer is fed to a T-die 26 and extruded in the form of a film. Likewise in the embodiment mentioned earlier, a five-layer film 27 thus extruded from the T-die 26 is cooled by a cooling roll 28 and pressed by a pressure roll 29. After the film 27 has passed through a roller 30 and a pair of rollers 31a, 31b, a non-adhesive thermoplastic polymer layer 32 forming the intermediate layer of the film 27 is separated from the liquid crystal polymer layers to form two two-layer films each having the liquid crystal polymer layer and the adhesive thermoplastic polymer layer. These films are respectively wound on winding rolls 33a, 33b. According to the method above-mentioned, two laminated films may be simultaneously obtained.

When the non-adhesive thermoplastic polymer layer is separated after the multi-layer film has been formed by co-extrusion molding, the laminated film may be considerably improved in characteristics. More specifically, when the liquid crystal polymer alone is made in the form of a film, the friction force generated at the lip of the die tip causes the surface layer portion of the highly oriented liquid crystal polymer film to be separated therefrom. This decreases the uniformity of the film. On the other hand, when the liquid crystal polymer layer is extruded as interposed, in lamination, between the adhesive thermoplastic polymer layer and the non-adhesive thermoplastic polymer layer, the friction force generated at the lip of the die tip does not act directly on the liquid crystal polymer layer. This produces a film excellent in surface smoothness. Further, a liquid crystal polymer film obtainable by extrusion molding is considerably decreased in strength in the TD direction as mentioned earlier. On the other hand, in the laminated film obtained by the method according to the present invention, the adhesive thermoplastic polymer layer integrally laminated on the liquid crystal polymer layer may restrain the decrease in strength of the laminated film in the TD direction thereof. Further, such a film may be readily uniaxially or biaxially stretched to enhance the strength of the laminated film. Furthermore, the adhesive thermoplastic polymer layer may impart, to the laminated film, heat-sealing properties and hot-melt adhesive properties. This enables the laminated film to be utilized as a packaging film satisfying a variety of requirements.

With the use of the co-extrusion molding machine having a plurality of passages as shown in FIG. 2, laminated films having a variety of lamination structures may be obtained, for example, by changing the types of polymers respectively supplied to the passages or by controlling the passages communication with the selector plugs.

The laminated film obtainable by the method of the present invention may have a lamination structure as shown in FIG. 3(A) in which an adhesive thermoplastic polymer layer 42 is laminated on one surface of a liquid crystal polymer layer 41, or a lamination structure as shown in FIG. 3(B) in which a plurality of adhesive thermoplastic polymer layers 52a, 52b are laminated on one surface of a liquid crystal polymer layer 51.

The laminated film may have a lamination structure as shown in FIG. 3(C) in which a non-adhesive thermoplastic polymer layer 63 is laminated on one surface of a liquid crystal polymer layer 61 through an adhesive thermoplastic polymer layer 62, or a lamination structure as shown in FIG. 3(D) in which a non-adhesive thermoplastic polymer layer 73 is laminated on one surface of a liquid crystal polymer layer 71 through a plurality of adhesive thermoplastic polymer layers 72a, 72b. The adhesive thermoplastic polymer layer has great adhesive properties not only with respect to the liquid crystal polymer layer, but also a variety of polymer layers. Accordingly, when the laminated film having the lamination structure shown in FIGS. 3(C) and (D) is provided at the surface side thereof with the non-adhesive thermoplastic polymer layer 63 or 73 made of a non-adhesive thermoplastic polymer excellent in heat-sealing properties or hot-melt adhesive properties, the film may be readily made in the form of a sack by pillow-type packaging, four-way sealing or the like. Examples of such a non-adhesive thermoplastic polymer include the PET-G and the olefin polymer mentioned earlier. Further, when a plurality of adhesive thermoplastic polymer layers 72a, 72b are laminated as shown in FIG. 3(D), the adhesive thermoplastic polymer layers 72a, 72b respectively take their share of the adhesive function with respect to the liquid crystal polymer layer 71 and the non-adhesive thermoplastic polymer layer 73 to enhance the adhesive strength of the film.

Further, the laminated film may have a lamination structure as shown in FIG. 3(E), in which a non-adhesive thermoplastic polymer layer 83 and an adhesive thermoplastic polymer layer 82b are successively formed on one surface of a liquid crystal polymer layer 81 through an adhesive thermoplastic polymer layer 82a.

Figure 3:
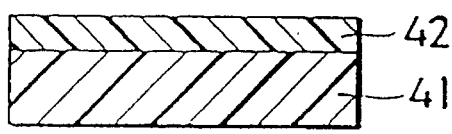
FIGS. 3(A), (B), (C), (D) and (E) are schematic section views respectively illustrating examples of a laminated film obtained according to the method of the present invention.
Figure 3:
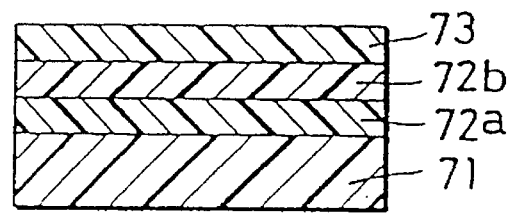
Figure 3:
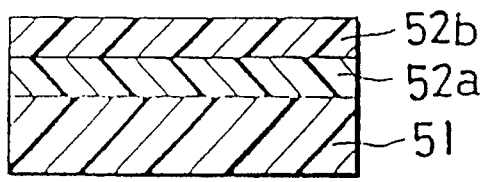
Figure 3:
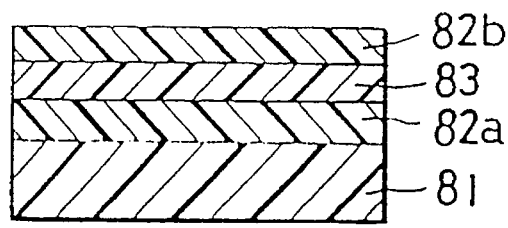
Figure 3:
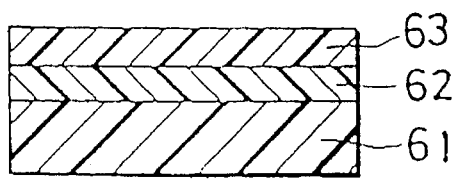

Laminated films obtainable by the method of the present invention may have other lamination structures than those shown in FIG. 3. That is, the laminated film may be formed by laminating at least one adhesive thermoplastic polymer layer on one surface of a liquid crystal polymer layer. Thus, there may be prepared films having a variety of lamination structures according to the applications. For example, the film may have a lamination structure including a plurality of liquid crystal polymer layers, a plurality of adhesive thermoplastic polymer layers and, as necessary, a plurality of non-adhesive thermoplastic polymer layers, or a lamination structure in which liquid crystal polymer layers and adhesive thermoplastic polymer layers are alternately laminated.

The number of the layers forming a laminated film is not critical but may be generally in the range of about 2 to 11, preferably 2 to 9.

The liquid crystal polymer extruding temperature may be suitably set according to the type of a polymer used. However, such a temperature is generally not less than the softening point of the polymer used. For example, the preferably liquid crystal polymers may be extruded generally at a temperature in a range from 200° to 400° C., and preferably from about 240° to about 340° C. The term "softening point" used herein refers to a minimum temperature at which the liquid crystal polymer starts melting and flowing. The extruding temperature of an adhesive thermoplastic polymer or a non-adhesive thermoplastic polymer is preferably higher than (T-50)°C. where T is the liquid crystal polymer extruding temperature. More preferably, the extruding temperature of the adhesive or non-adhesive thermoplastic polymer is T +/-50° C.

The molding conditions such as polymer extruding speeds, cooling roll temperatures, film drawing speeds and the like may be suitably set according to the characteristics of the desired film.

The laminated film may be uniaxially or biaxially stretched at a suitable magnification with stretching means of roll stretching, belt stretching, tenter stretching, tube stretching or the like.

The thickness of the laminated film obtainable by the method of the present invention is not particularly restricted. However, such a thickness is preferably in a range from about 10 to 1,000 μm. The thickness of the liquid crystal polymer layer is generally in a range from 1 to 500 μm, and preferably in a range from about 5 to about 250 μm. The thickness of the adhesive or non-adhesive thermoplastic polymer is generally in a range from about 1 to 100 μm.

The laminated film may be subjected to a surface treatment such as corona discharge treatment, sputtering treatment, high frequency treatment, flame treatment, chromic acid treatment, solvent etching treatment, undercoat treatment, or a combination of the treatments above-mentioned.

INDUSTRIAL APPLICABILITY

The laminated film obtained by the method of the present invention may be used as a film for packing a variety of articles in the form of piece-packaging, internal packaging, external packaging or sack packaging. For example, the laminated film may be used as a food packaging material for retort foods, microwave-cooking foods or the like; a packaging material for oil cooking materials; a chemicals packaging material; a cosmetic goods packaging material; a fragrance holding packaging material for fragrant goods; and a protective film for protecting a desk, a test stand or the like.

The following Examples and Comparative Examples illustrate the invention in further detail but are by no means limitative of the scope thereof.

EXAMPLES

Adhesive thermoplastic polymers used in Examples and Comparative Examples are respectively represented by the following marks.
A-1: A glycidyl modified polyethylene (REXPEARL J-3700 manufactured by Nippon Petrochemical Co., Ltd.)
A-2: An alkoxysilane modified ethylene-ethyl acrylate copolymer (HPR AS252 manufactured by Dupont-Mitsui polychemicals Co., Ltd.)
A-3: A glycidyl modified ethylene-vinyl acetate copolymer (BONDFAST 7B manufactured by Sumitomo Chemical Co., Ltd.)
A-4: An acrylate-maleic anhydride modified polyethylene (BONDIN AX8060 manufactured by Sumitomo Chemical Co., Ltd.)
A-5: A polyester (BYRON GM-900 manufactured by Toyobo Co., Ltd.)
A-6: A polyester (ARONMELT PES-140H manufactured by Toa Gosei Chemical Industry Co., Ltd.)
A-7: A polyester (KEMITT R50 manufactured by Toray Industries Inc.)
Non-adhesive thermoplastic polymers used in Examples and Comparative Examples are respectively represented by the following marks.
PP: Polypropylene (NORBLEN FL6315G manufactured by Sumitomo Chemical Co., Ltd.)
PE: An intermediate-density polyethylene (NEOZEX 3510F manufactured by Mitsui Petrochemical Industries Ltd.)
PET: Polyethylene terephthalate (manufactured by Unitika Ltd.; intrinsic viscosity of 0.65)
PET-G: Polyethylene terephthalate in which part of glycol components is being substituted with 1,4-cyclohexanedimethanol (PETG5116 manufactured by Eastman Chemical Products Inc.)
PBT: Polybutylene terephthalate (manufactured by Polyplastic Co., Ltd.; intrinsic viscosity of 1.0 dl/g as measured in orthochlorophenol at a temperature of 25° C.)

The liquid crystal polymer layer of an obtained laminated film is represented by LCP.

Example 1

With the use of the co-extrusion molding machine in FIG. 1, a liquid crystal polymer (VECTRA A900 manufactured by Polyplastics Co., Ltd.) composed of polyester (A) formed by the repeating units I and II mentioned earlier was molten and extruded by an extruder and fed to the feed block through the feed pipe 1. An adhesive thermoplastic polymer A-1 and a non-adhesive thermoplastic polymer PP were respectively molten and extruded by extruders and fed to the feed block through the feed pipes 2 and 3, respectively. The resultant three-layer molten polymer was extruded from the T-die 5 to form a film. Before the film reaches the winding roll 12, the PP layer is separated from the liquid crystal polymer layer to give a laminated film having a lamination structure of LCP/A-1=10/10 (μm) as shown in FIG. 3(A).

Example 2

A laminated film having a lamination structure of LCP/A-2=10/10 (μm) was prepared in the same manner as in Example 1, except that an adhesive thermoplastic polymer A-2 and a non-adhesive thermoplastic polymer PE were used respectively instead of the adhesive thermoplastic polymer A-1 and the non-adhesive thermoplastic polymer PP used in Example 1, and that the PE layer instead of the PP layer was separated.

Example 3

A laminated film having a lamination structure of LCP/A-3=10/10 (μm) was prepared in the same manner as in Example 1, except that an adhesive thermoplastic polymer A-3 and a non-adhesive thermoplastic polymer PET were used respectively instead of the adhesive thermoplastic polymer A-1 and the non-adhesive thermoplastic polymer PP used in Example 1, and that the PET layer instead of the PP layer was separated.

Example 4

A laminated film having a lamination structure of LCP/A-4=10/10 (μm) was prepared in the same manner as in Example 1, except that an adhesive thermoplastic polymer A-4 was used instead of the adhesive thermoplastic polymer A-1 used in Example 1.

Example 5

A laminated film having a lamination structure of LCP/A-5=10/10 (μm) was prepared in the same manner as in Example 1, except that an adhesive thermoplastic polymer A-5 was used instead of the adhesive thermoplastic polymer A-1 used in Example 1.

Example 6

A laminated film having a lamination structure of LCP/A-6=10/10 (μm) was prepared in the same manner as in Example 1, except that an adhesive thermoplastic polymer A-6 was used instead of the adhesive thermoplastic polymer A-1 used in Example 1.

Example 7

A laminated film having a lamination structure of LCP/A-7=10/10 (μm) was prepared in the same manner as in Example 1, except that an adhesive thermoplastic polymer A-7 was used instead of the adhesive thermoplastic polymer A-1 used in Example 1.

Example 8

With using the co-extrusion molding machine shown in FIG. 2 to which four extruders are connected, a liquid crystal polymer used in Example 1 was fed to the passage 22a and a non-adhesive thermoplastic polymer PP used in Example 1 was fed to the passage 23a with the selector plugs 25a, 25b controlled such that no polymer was fed to the passage 21. An adhesive thermoplastic polymer A-1 used in Example 1 was fed to the passage 22b and a non-adhesive thermoplastic polymer PET-G was fed to the passage 23b. The resultant four-layer molten polymer was extruded from the T-die 26 to form a film. Before the film reached one roll 33a in FIG. 2, the PP layer was separated from the liquid crystal polymer layer. The film was then wound on the winding roll 33a to obtaine a laminated film having a lamination structure of LCP/A-1/PET-G=10/5/10 (μm) as shown in FIG. 3(C).

Example 9

With using the co-extrusion molding machine shown in FIG. 2 to which four extruders are connected, the selector plugs 25a, 25b were controlled such that a liquid crystal polymer used in Example 1 was fed to the passage 22a and a non-adhesive thermoplastic polymer PP used in Example 1 was fed to the passage 23a and an adhesive thermoplastic polymer A-2 used in Example 2 was fed to the passage 21. A non-adhesive thermoplastic polymer PBT was fed to the passage 22b and an adhesive thermoplastic polymer A-1 in Example 1 was fed to the passage 23b. The resultant five-layer molten polymer was extruded from the T-die 26 to form a film. Before the film reached one winding roll 33a shown in FIG. 2, the PP layer was separated. The film was then wound on the winding roll 33a to prepare a laminated film having a lamination structure of LCP/A-2/PBT/A-1=10/5/10/10 (μm) as shown in FIG. 3(E).

Example 10

With the use of the co-extrusion molding machine shown in FIG. 2, a non-adhesive thermoplastic polymer PP identical with that used in Example 1 was fed to the passage 21, a liquid crystal polymer used in Example 1 was fed to the passage 22a and 22b, and an adhesive thermoplastic polymer A-2 used in Example 2 was fed to the passages 23a and 23b. The resultant five-layer molten polymer was extruded from the T-die 26 to form a film. While the PP layer was separated, the resultant divided films were respectively wound on the winding rolls 33a and 33b as shown in FIG. 2. Thus, there were simultaneously prepared two laminated films each having a lamination structure of LCP/A-2/=10/10 (μm) as shown in FIG. 3(A).

Comparative Example 1

With the use of a normal T-die extruder, a liquid crystal polymer used in Example 1 was molded into a film having a thickness of 30 μm.

Comparative Example 2

With the use of a normal co-extrusion molding machine, a liquid crystal polymer used in Example 1 and PP used in Example 1 were co-extruded and molded into a film having a lamination structure of LCP/PP=10/10 (μm). However, both polymers present no adhesive properties with respect to each other so that the LCP layer was easily separated from the PP layer, failing to prepare a composite film. It was tried to extrude and mold the polymers above-mentioned with using the co-extrusion molding machine of the feed block type shown in FIG. 1. Even in this case, the polymers could not be made in the form of a composite film. This resulted in uneconomical waste of materials. Accordingly, the film of Comparative Example 2 was not subjected to the following tests.

Tests were conducted on the films of Examples and Comparative Example 1 to measure their tensile strength values in the TD direction and the MD direction at a right angle thereto, as well as their oxygen gas permeability and vapor permeability, under the following conditions.

Oxygen Gas Permeability

With the use of carrier gas containing 98% of nitrogen gas and 2% of hydrogen gas, the oxygen gas permeability was measured under the conditions of a temperature of 23° C. and a relative humidity of 60% by an isotactic method according to ASTM D-3985-81.

Vapor Permeability

With the use of air as carrier gas, the vapor permeability was measured under the conditions of a temperature of 25° C. and a relative humidity of 90% with an infrared-ray sensor according to ASTM F-372-73.

The results are shown in the following Table.

TABLE

| | Tensile strength (kgf/cm$^2$) | | Oxygen Gas Permeability (cc/m$^2$ · 24 hours · atm) | Vapor Permeability (g/m$^2$ · 24 hours · atm) |
|---|---|---|---|---|
| | TD direction | MD direction | | |
| Example 1 | 700 | 5,400 | 0.4 | 0.9 |
| Example 2 | 680 | 5,500 | 0.3 | 1.0 |
| Example 3 | 800 | 5,400 | 0.3 | 0.8 |
| Example 4 | 740 | 5,400 | 0.4 | 1.0 |
| Example 5 | 690 | 5,600 | 0.3 | 0.8 |
| Example 6 | 680 | 5,600 | 0.3 | 0.9 |
| Example 7 | 700 | 5,500 | 0.3 | 0.8 |
| Example 8 | 780 | 5,400 | 0.3 | 0.8 |
| Example 9 | 900 | 5,400 | 0.3 | 0.8 |
| Example 10 | 730 | 5,400 | 0.3 | 1.0 |
| Comparative Example 1 | 160 | 5,900 | 0.6 | 1.2 |

As apparent from Table, the film of Comparative Example 1 is considerably weak in strength and susceptible to tear in the TD direction. The film of Comparative Example 1 presents no heat-sealing properties and could not be dry-laminated on a polyethylene terephthalate film.

On the contrary, each of the laminated films of Examples is excellent in gas barrier characteristics and strength in the TD direction. Each of the laminated films of Examples could be dry-laminated on a polybutylene terephthalate film or a polyethylene terephthalate film with the use of the adhesive thermoplastic polymer layer, and could be formed into a packaging sack by heat-sealing. The laminated film of Example 8 could be formed into a sack with the use of the PET-G layer by heat-sealing.

We claim:

1. A method of manufacturing a multilayer film comprising the steps of:

providing a thermotropic liquid crystal polymer layer having a first surface and a second surface, and comprising a polyester substantially containing 10 to 90 mol % of the following repeating unit I and 10 to 90 mol % of the following repeating unit II;

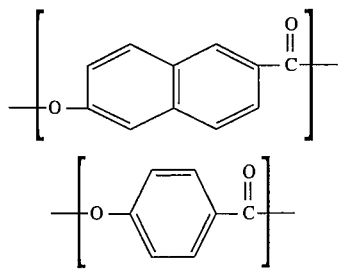

laminating at least one adhesive thermoplastic polymer layer selected from the group consisting of a carboxy modified polyolefin and a glycidyl modified polyolefin on said first surface of said liquid crystal polymer layer;

laminating a first non-adhesive thermoplastic polymer layer selected from the group consisting of an olefin polymer, a polyalkylene terephthalate, a polycarbonate and a polyamide to said second surface of said liquid crystal polymer layer;

laminating a second non-adhesive thermoplastic polymer layer selected from the group consisting of an olefin polymer, and a polyethylene terephthalate in which part of ethylene glycol is substituted with 1,4-cyclohexanedimethanol or diethylene glycol, said second non-adhesive thermoplastic polymer layer having hot-melt adhesive properties, being non-adhesive relative to said liquid crystal polymer layer, and being adhered to said at least one adhesive thermoplastic polymer layer, said adhesive thermoplastic polymer layer increasing the adhesive strength between the respective layers of the multilayer film, said layers being laminated in a co-extrusion molding machine to form a laminated film;

extruding said laminated film from a die; and separating said laminated film by separating said first non-adhesive thermoplastic polymer layer from said second surface of said liquid crystal polymer layer to form the multilayer film composed of the thermotropic liquid crystal polymer layer, the at least one adhesive thermoplastic polymer layer, and the second non-adhesive thermoplastic polymer layer, respectively laminated and adhered together.

2. A method of manufacturing a laminated film according to claim 1, wherein the thermotropic liquid crystal polymer is at least one polymer selected from the group consisting of a polythiol ester, a polyester amide, a polyazomethine and a polyester carbonate.

3. A method of manufacturing a laminated film according to claim 1, wherein the thermotropic liquid crystal polymer is a fully aromatic polyester.

4. A method of manufacturing a laminated film according to claim 3, wherein the weight-average molecular weight of the fully aromatic polyester is in a range from 2,000 to 200,000.

5. A method of manufacturing a laminated film according to claim 1, wherein the thermotropic liquid crystal polymer is a fully aromatic polyester amide.

6. A method of manufacturing a laminated film according to claim 5, wherein the weight-average molecular weight of the fully aromatic polyester amide is in a range from 5,000 to 50,000.

7. A method of manufacturing a laminated film according to claim 1, wherein the thermal deformation temperature of the thermotropic liquid crystal polymer is in a range from 120° to 350° C.

8. A method of manufacturing a laminated film according to claim 7, wherein the thermal deformation temperature of the thermotropic liquid crystal polymer is in a range from 150° to 250° C.

9. A method of manufacturing a laminated film according to claim 1, wherein the elastic modulus of the thermotropic liquid crystal polymer is in a range from $6.0 \times 10^4$ to $2.5 \times 10^5$ kgf/cm$^2$.

10. A method of manufacturing a laminated film according to claim 1, wherein the tensile strength of the thermotropic liquid crystal polymer is in a range from 1,000 to 3,000 kgf/cm$^2$.

11. A method of manufacturing a laminated film according to claim 1, wherein the thermotropic liquid crystal polymer has a vapor permeability of 8 g/m$^2$•25 μm•24 hours•atm or less.

12. A method of manufacturing a laminated film according to claim 1, wherein the thermotropic liquid crystal polymer has oxygen/carbon dioxide gas permeability of 10 cc/m$^2$•25 μm•24 hours•atm or less.

13. A method of manufacturing a laminated film according to claim 1, wherein the thermotropic liquid crystal polymer presents dimensional variations from 0.003 to 0.02% at a temperature of 70° C. and at a relative humidity of 96%.

14. A method of manufacturing a laminated film according to claim 1, wherein the liquid crystal polymer layer contains 75% by weight or more of a thermotropic liquid crystal polymer.

15. A method of manufacturing a laminated film according to claim 1, wherein the adhesive thermoplastic polymer has heat-sealing properties or hot-melt adhesive properties.

16. A method of manufacturing a laminated film according to claim 1, wherein the adhesive thermoplastic polymer layer contains 75% by weight or more of an adhesive thermoplastic polymer.

17. A method of manufacturing a laminated film according to claim 1, wherein the non-adhesive thermoplastic polymer layer contains 75% by weight or more of a non-adhesive thermoplastic polymer.

* * * * *